US008049905B2

(12) United States Patent
Matsumoto

(10) Patent No.: US 8,049,905 B2
(45) Date of Patent: Nov. 1, 2011

(54) COMPUTER READABLE RECORDING MEDIUM BEARING A PRINTER DRIVER PROGRAM AND PRINT DATA PROCESSING APPARATUS

(75) Inventor: Yukinori Matsumoto, Amagasaki (JP)

(73) Assignee: Minolta Co., Ltd., Osaka-shi (JP)

( * ) Notice: Subject to any disclaimer, the term of this patent is extended or adjusted under 35 U.S.C. 154(b) by 1005 days.

(21) Appl. No.: 10/445,319

(22) Filed: May 27, 2003

(65) Prior Publication Data

US 2003/0218766 A1 Nov. 27, 2003

(30) Foreign Application Priority Data

May 27, 2002 (JP) .................................. 2002-152831
Apr. 24, 2003 (JP) .................................. 2003-120321

(51) Int. Cl.
*G06F 3/12* (2006.01)
(52) U.S. Cl. ...................... 358/1.13; 358/1.15; 358/3.12; 358/528; 358/451; 382/298; 382/277; 382/290; 382/292; 345/660; 345/666; 719/322; 715/243
(58) Field of Classification Search .................. 358/1.13, 358/1.2, 3.12, 528, 451, 1.16, 1.15; 382/298, 382/277, 290, 292; 719/322; 345/660, 666; 715/243
See application file for complete search history.

(56) References Cited

U.S. PATENT DOCUMENTS

| | | | | |
|---|---|---|---|---|
| 4,786,921 A | * | 11/1988 | Suzuki | 347/111 |
| 4,928,252 A | * | 5/1990 | Gabbe et al. | 358/1.2 |
| 5,316,396 A | * | 5/1994 | Fukaya | 400/76 |
| 5,649,216 A | * | 7/1997 | Sieber | 715/506 |
| 5,748,860 A | * | 5/1998 | Shively | 358/1.15 |
| 6,144,974 A | * | 11/2000 | Gartland | 715/517 |
| 6,437,876 B1 | * | 8/2002 | Phang et al. | 358/1.2 |
| 6,459,498 B2 | * | 10/2002 | Miyake et al. | 358/1.15 |
| 6,642,923 B1 | * | 11/2003 | Stone et al. | 345/427 |

(Continued)

FOREIGN PATENT DOCUMENTS

JP 08-292755 11/1996

(Continued)

OTHER PUBLICATIONS

Japanese Notice of Reasons of Refusal, mailed Nov. 18, 2008, directed to Japanese Patent Application No. 2003-120321; 4 pages.
Japanese Decision of Refusal, mailed Jun. 9, 2009, directed to corresponding Japanese Patent Application No. 2003-120321; (4 pages).

*Primary Examiner* — Chan S. Park
*Assistant Examiner* — Jacky X Zheng
(74) *Attorney, Agent, or Firm* — Morrison & Foerster LLP

(57) ABSTRACT

A computer readable recording medium bearing a printer driver program for controlling a print device, which is installed in a print job data processing apparatus constituting a printing system together with the printing device, the printer driver program comprising computer executable instructions of; receiving a print job data from an application program which has a print command; analyzing the received print job data from the application program to identify respective objects included in the page description language data; calculating a position where each object is arranged on a printable area designated depending on output paper size; and modifying the object to allow the object to be accommodated within the printable area, thereby accomplishing a correct print operation such that a print region designated by a user is accommodated to a predetermined output paper size without depending on a function of an application.

9 Claims, 9 Drawing Sheets

U.S. PATENT DOCUMENTS

| | | | |
|---|---|---|---|
| 6,879,943 B1 * | 4/2005 | Shigemori | 703/2 |
| 7,084,995 B2 * | 8/2006 | Mori et al. | 358/1.15 |
| 7,113,305 B1 * | 9/2006 | Matsubayashi | 358/1.2 |
| 7,257,770 B2 * | 8/2007 | Narahara | 715/513 |
| 2001/0011364 A1 * | 8/2001 | Stoub | 717/1 |
| 2001/0043354 A1 * | 11/2001 | Miyake et al. | 358/1.15 |
| 2002/0036788 A1 * | 3/2002 | Hino | 358/1.11 |
| 2002/0040375 A1 * | 4/2002 | Simon et al. | 707/517 |
| 2002/0041718 A1 * | 4/2002 | Ohmori | 382/298 |
| 2004/0028292 A1 * | 2/2004 | Alm et al. | 382/298 |

FOREIGN PATENT DOCUMENTS

| | | |
|---|---|---|
| JP | 10-074265 | 3/1998 |
| JP | 11-099724 | 4/1999 |
| JP | 11-191057 | 7/1999 |
| JP | 2000-330908 | 11/2000 |
| JP | 2001-043049 | 2/2001 |
| JP | 2001-094769 | 4/2001 |
| JP | 2002-14891 | 1/2002 |
| JP | 2002014891 A * | 1/2002 |

* cited by examiner

COMPUTER READABLE RECORDING MEDIUM BEARING A PRINTER DRIVER PROGRAM AND PRINT DATA PROCESSING APPARATUS

This application is based on application No. 2002-152831 and No. 2003-120321 filed in Japan, the contents of which is hereby incorporated by reference.

BACKGROUND OF THE INVENTION

1. Field of the Invention

The present invention relates to a computer readable recording medium bearing a printer driver program for editing print job data and a print data processing apparatus in which the printer driver program is installed.

2. Description of the Background Art

In the field of a conventional print data processing system, for example, as disclosed in Japanese Patent laid-open publication Hei 11-1915057, a technique which performs a print operation in accordance with an output paper size designated by changing an output magnification of print job data is proposed, or as described in Japanese Patent laid-open publication 2000-330908, a technique which performs a print operation in accordance with an output paper size edited and designated by a user herself/himself by using an application having a user interface for editing a Markup Language Source is proposed.

However, in a conventional print data processing system, when the print data processing system performs a print operation by using an application which does not have a means for setting and changing the details of a layout such as arrangements of pages, letters, graphics, and the like and does not have a function for editing print data, there is a problem in which a designated print region cannot be printed within an output paper size.

SUMMARY OF THE INVENTION

The present invention has been made in consideration of the technical problem, and has as its object to provide a computer readable recording medium bearing a printer driver program and a print data processing apparatus in which the printer driver program is installed, to accomplish a correct print operation such that a print region designated by a user is accommodated to a predetermined output paper size without depending on a function of an application.

In an aspect of the present invention, there is provided a computer readable recording medium bearing a printer driver program for controlling a print device, which is installed in a print job data processing apparatus constituting a printing system together with the printing device, the printer driver program comprising computer executable instructions of: receiving a print job data from an application program which has a print command; analyzing the received print job data from the application program to identify respective objects included in the page description language data; calculating a position where each object is arranged on a printable area designated depending on output paper size; and modifying the object to allow the object to be accommodated within the printable area.

The printer driver program further may comprise computer executable instruction of converting the modified data to a page description language after modifying each object for its drawing region.

Furthermore, the printer driver program may comprise computer executable instruction of converting the print job data to a page description language after receiving a print job data, to modify the object with the converted page description language.

The computer executable instruction of modifying the object may comprise an instruction of allowing each object to be modified respectively. The instruction of allowing each object to be modified respectively may be an instruction of reducing the object or displacing a region on which the object is arranged.

The instruction of reducing the object may comprise an instruction of reducing by scaling factor different for lengthwise and crosswise.

In another aspect of the present invention, there is provided a print data processing apparatus constituting a printing system together with a printing device, in which a printer driver program for controlling the printing device is installed, the apparatus comprising: a receiver for receiving a print job data from an application program which has a print command; an analyzer for analyzing the received print job data from the application program to identify respective objects included in the page description language data; a calculator for calculating a position where each object is arranged on a printable area designated depending on output paper size; and a modification processor for modifying the object to allow the object to be accommodated within the printable area.

According to these aspects, a print result satisfying user's demand can be acquired without depending on the application even though there is a difference between a drawing region designated based on output paper size and a printable area of paper designated based on printer characteristic.

DETAILED DESCRIPTION OF THE PREFERRED EMBODIMENTS

Embodiments of the present invention will be described below with reference to the accompanying drawings.

First Embodiment

Figure 1:
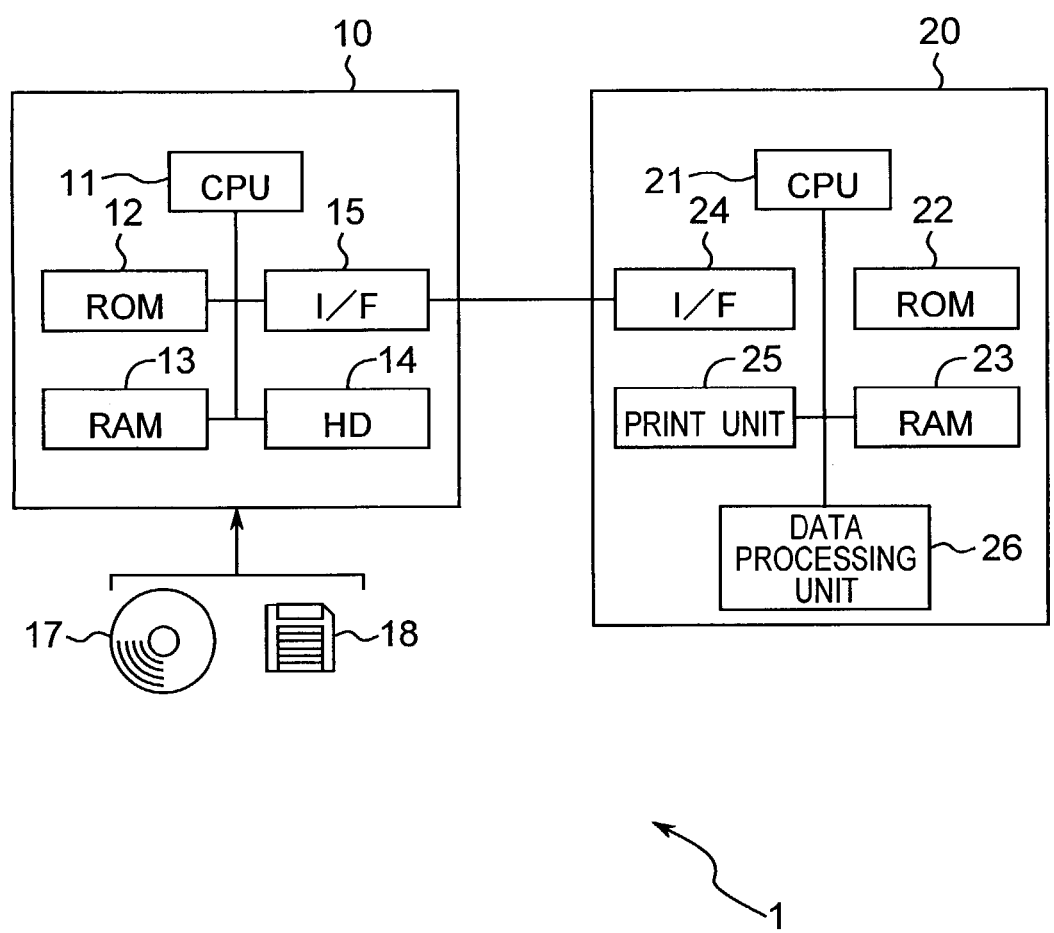
FIG. 1 is a block diagram showing a print system in which print job data processing is controlled on the basis of a printer driver according to the first embodiment of the present invention.

FIG. 1 is a block diagram showing a print system in which print job data processing is controlled on the basis of a printer driver program (to be referred to as a printer driver hereinafter) according to the first embodiment of the present invention. This print system 1 comprises a personal computer (to be referred to as a PC hereinafter) 10 and a printer 20 for outputting job data transmitted from the PC 10 as a print.

The PC 10 includes a CPU 11 for performing sequence control of the PC itself on the basis of an operating system (to be referred to as an OS hereinafter) serving as fundamental software, a ROM 12 for recording a program or the like executed at the start of the PC 10, a RAM 13 used as a buffer area of a work area required for executing the program, a hard disk (indicated by an "HD" in FIG. 1) 14 for storing the OS, an application program (to be referred to as an application hereinafter), and various data, and an interface unit (indicated by an "I/F" in FIG. 1) 15 for transferring the various data to and from the interface unit 15 and the printer 20. Although not shown, the PC 10, for example, includes a monitor display which can visually display various pieces of information such as an application screen, a CD-ROM drive, a floppy (registered mark) disk drive, and a configuration of an input device such as a keyboard or a mouse.

In the PC 10, the OS is designed to provide various functions such as a function of displaying a screen and a function of storing a document. The OS has a plurality of device drivers of software forms which can control predetermined hardware independently of kernel serving as the central core of the OS. As one of the device drivers, a printer driver program (to be referred to as a printer driver hereinafter) which can set various print conditions and can perform printer control is installed to allow the PC 10 to recognize the printer 20 serving as an output destination of the job data. The printer driver is generally installed in the PC 10 by an external recording medium such as a CD-ROM 17 or a floppy (registered mark) disk 18 bundled at the time of delivery.

On the other hand, the printer 20 includes a CPU 21 for performing sequence control of the printer itself, a ROM 22 for recording a program related to the sequence control performed by the CPU 21, a RAM 23 used as a work area required for a program or a buffer area of job data transmitted from the PC 10, an interface unit (indicated by an "I/F" in FIG. 1) 24 for transmitting and receiving various data between the I/F 24 and the PC 10, a print unit 25 for executing a print operation to a sheet of paper based on the job data, and a data processing unit 26 for performing various data processing such as color space conversion or a binarization.

Figure 2:
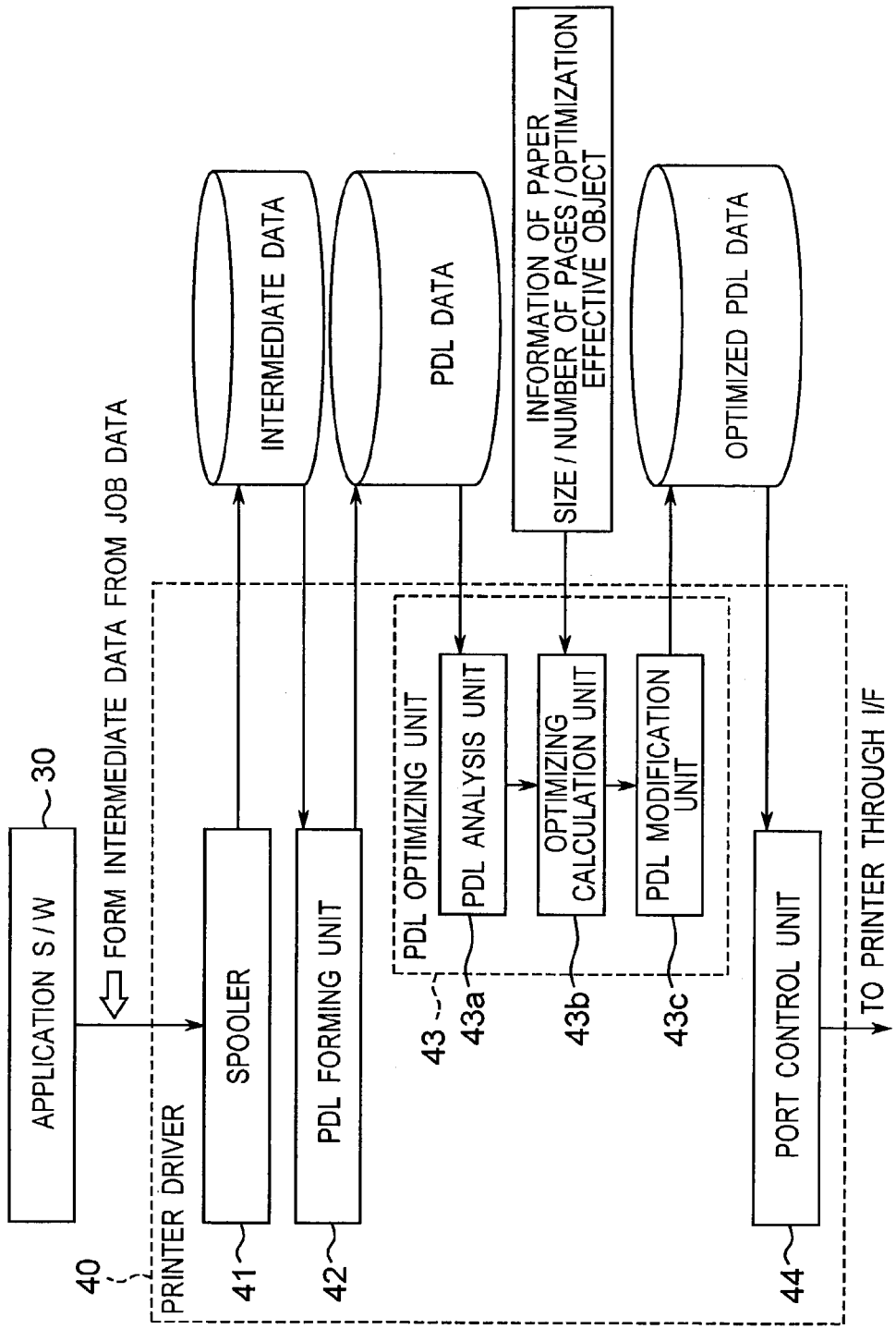
FIG. 2 is a schematic diagram showing an output process of the print job data executed on a PC by using the printer driver according to the first embodiment of the present invention.

FIG. 2 is a schematic diagram showing an output process executed by the printer driver of data (print job data) to be printed by the PC 10. It is assumed that an application (indicated by an "application S/W" in FIG. 2) 30 mentioned here is of being free from the concept of pages, e.g., a WEB browser or the like, has no means which makes it possible to exactly set or modify the details of a page layout such as arrangements of pages, characters, graphics, and the like.

When a user designates the PC 10 to print information data processed by the application 30 and displayed on the monitor display (not shown), the print job data is given to the OS first to form intermediate data based on the job data by kernel serving as the central core of the OS. The intermediate data is formed in accordance with the capability of a printer driver 40 which will be immediately used. Thereafter, the intermediate data is supplied to the printer driver 40. Although not shown especially, according to this, on the monitor display, as known in the prior art, a GUI screen obtained by the printer driver is displayed. On the GUI screen, various parameters (output paper size or the like) related to print can be set by a user.

In FIG. 2, although the printer driver 40 is indicated by a plurality of hardware blocks, these blocks denote various program functions executed by the printer driver 40, respectively. In this embodiment, the printer driver 40 has, as its fundamental functions, a spooler function, a PDL (Page Description Language) forming function, a PDL optimizing function, and a port control function. In addition, the PDL optimizing function is constituted by a PDL analysis function, an optimizing calculation function, and the PDL modification function. Hardware configurations such as a spooler 41, a PDL forming unit 42, a PDL optimization unit 43, a port control unit 44, a PDL analysis unit 43a, an optimizing calculation unit 43b, and a PDL modification unit 43c which execute the above functions are assumed and will be described below.

In the printer driver 40, the supplied intermediate data is temporarily stored in a storage device such as RAM 13 or hard disk 14 by the spooler 41. The intermediate data stored in the storage device is loaded by the PDL forming unit 42 and converted into PDL data. The converted PDL data, like the intermediate data, is temporarily stored in the storage device such as RAM 13 or hard disk 14.

The PDL data is optimized by the PDL optimization unit 43 such that objects are fitted in a designated output paper size. More specifically, the PDL data stored in the storage device is loaded by the PDL analysis unit 43a and analyzed. As will be described later with reference to FIG. 3, with this analysis, pieces of information (to be referred to as object information hereinafter) related to the respective objects included in the print job data are investigated. As the object information, information representing a position where an object is drawn in the designated output paper size is acquired.

Furthermore, on the basis of object information and information of objects (optimization effective object in FIG. 2) serving as objects of the designated output paper size/the number of pages/optimization, calculation for finding how to modify a specific object is performed by optimizing calculation unit 43b such that the object is fitted in the designated output paper size. On the basis of the calculation result, the PDL data is modified by the PDL modification unit 43c. The modified PDL data is stored in the storage device such as RAM 13 or hard disk 14. Thereafter, the modified PDL data stored in the storage device is transmitted to the port control unit 44 and output to the printer 20 through the I/F 15 (see FIG. 1).

Figure 3:
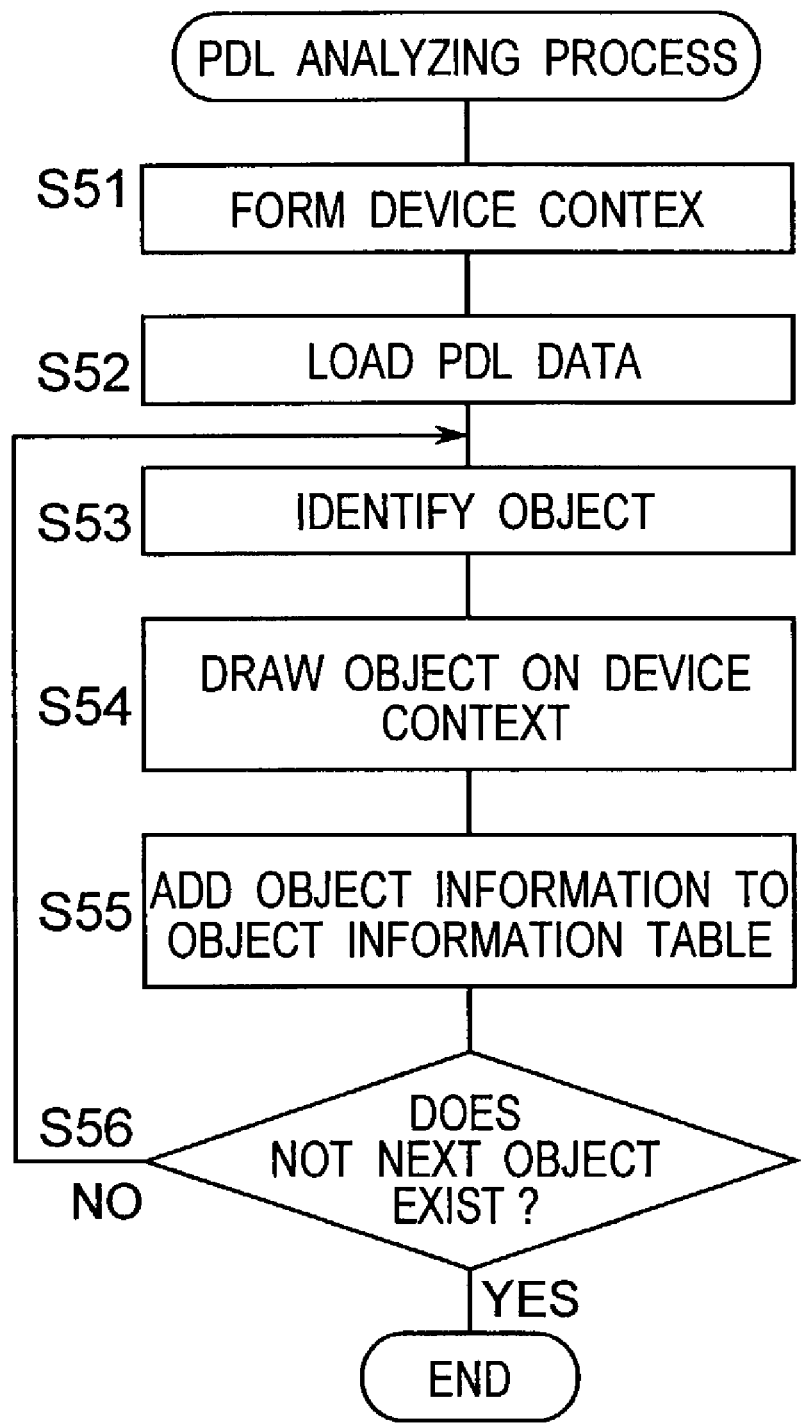
FIG. 3 is a flow chart of a PDL analyzing process executed by the printer driver according to the first embodiment of the present invention.

FIG. 3 is a flow chart of a PDL analyzing process executed by the PDL analysis unit 43a. In this PDL analyzing process, a device context is formed on the storage device such as RAM 13 or hard disk 14 of the PC 10(S51). The device context can perform an operation of a canvas on which various objects are arranged. In the device context, in relation to an object for managing the appearance of a text and a graphic on the monitor display or the printer, information is stored by a GDI (Graphical Device Interface). After the formation of the device context, the PDL data stored in the storage device is loaded (S52). The PDL data includes a parameter representing how to draw identifiers of the objects, the respective objects, and the like. As the PDL data is loaded, the identifiers of these objects and various parameters are identified (S53).

On the basis of the identifiers of the identified objects and the various parameters, the objects are drawn on the device context (S54). Object information representing a position where an acquired object is drawn on the device context is added to an object information table (S55). Thereafter, it is decided whether the next object exists or not (S56). When the next object exists, the control flow returns to S53 to repeat the subsequent processes. On the other hand, when the next object does not exist, the processes are ended.

Figure 4:
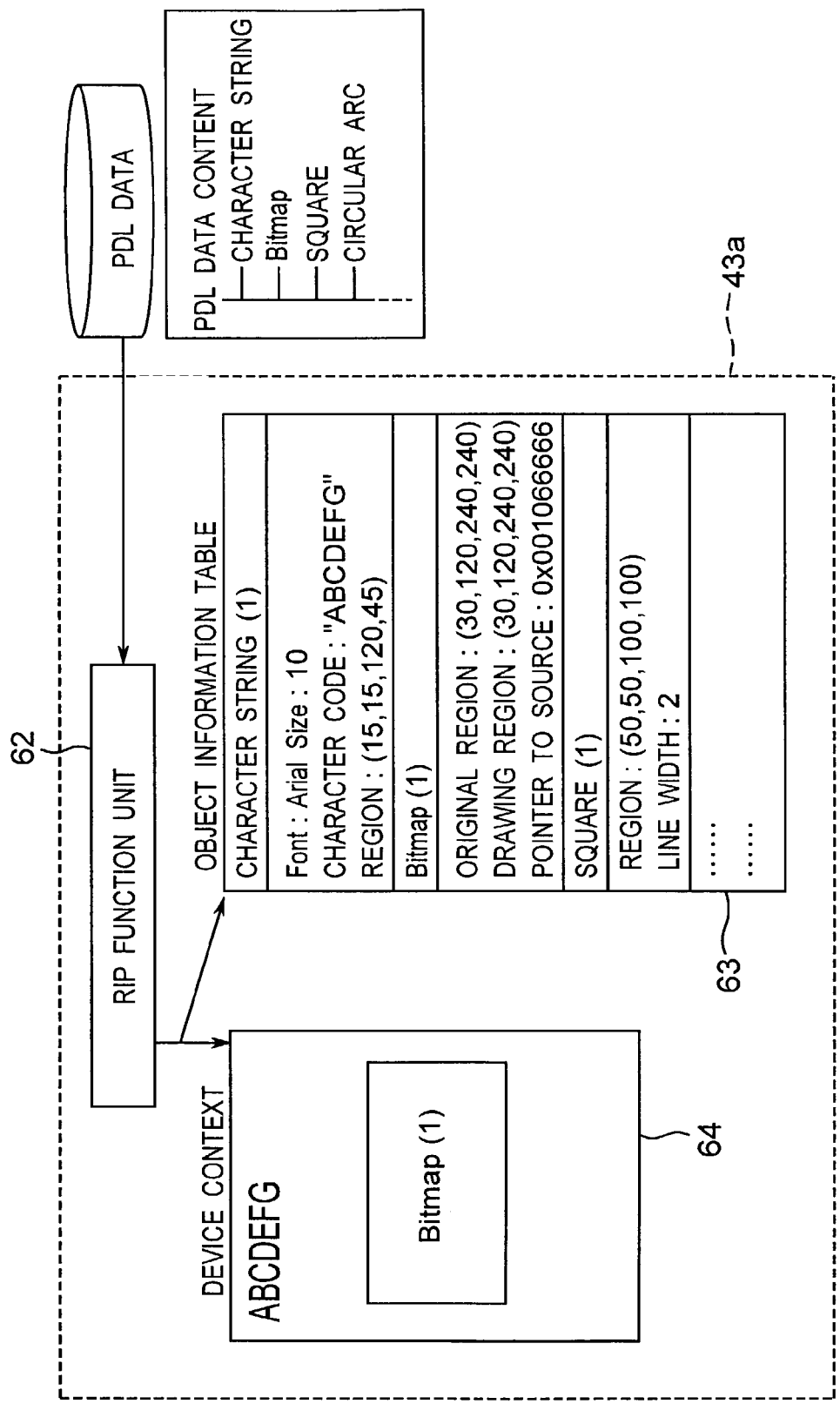
FIG. 4 is a schematic diagram explaining the PDL analyzing process.

FIG. 4 is a schematic diagram explaining a PDL analysis process. In the PDL analysis process, as described above, a device context 64 on which the various objects are arranged is formed. After the device context 64 is formed, the PDL data is loaded. The PDL analysis unit 43a has a RIP (Raster Image Processor) function which converts the PDL data described by a command into dot data. Through the RIP function unit 62, various objects are acquired from PDL data, and sequentially arranged on the device context 64.

The PDL data, as shown in FIG. 4, includes various objects such as a character string, a bitmap, a square, and a circular arc. The RIP function unit 62 can acquire the objects and, at the same time, can identify the identifiers of the objects and the parameters which are included in the PDL data. The acquired various objects are drawn at a predetermined position on the device context 64 on the basis of the identifiers of the objects and the parameters.

Depending on the PDL analyzing process, for example, on the storage device such as RAM 13 or hard disk 14, an object information table 63 for storing information of various objects is set. With the drawing of one object, information representing a position wherein the object is drawn on the device context 64 is added to the object information table 63 and stored. Upon completion of the processes related to all the objects included in the PDL data, the device context 64 on which the various objects are arranged is acquired.

Figure 5:
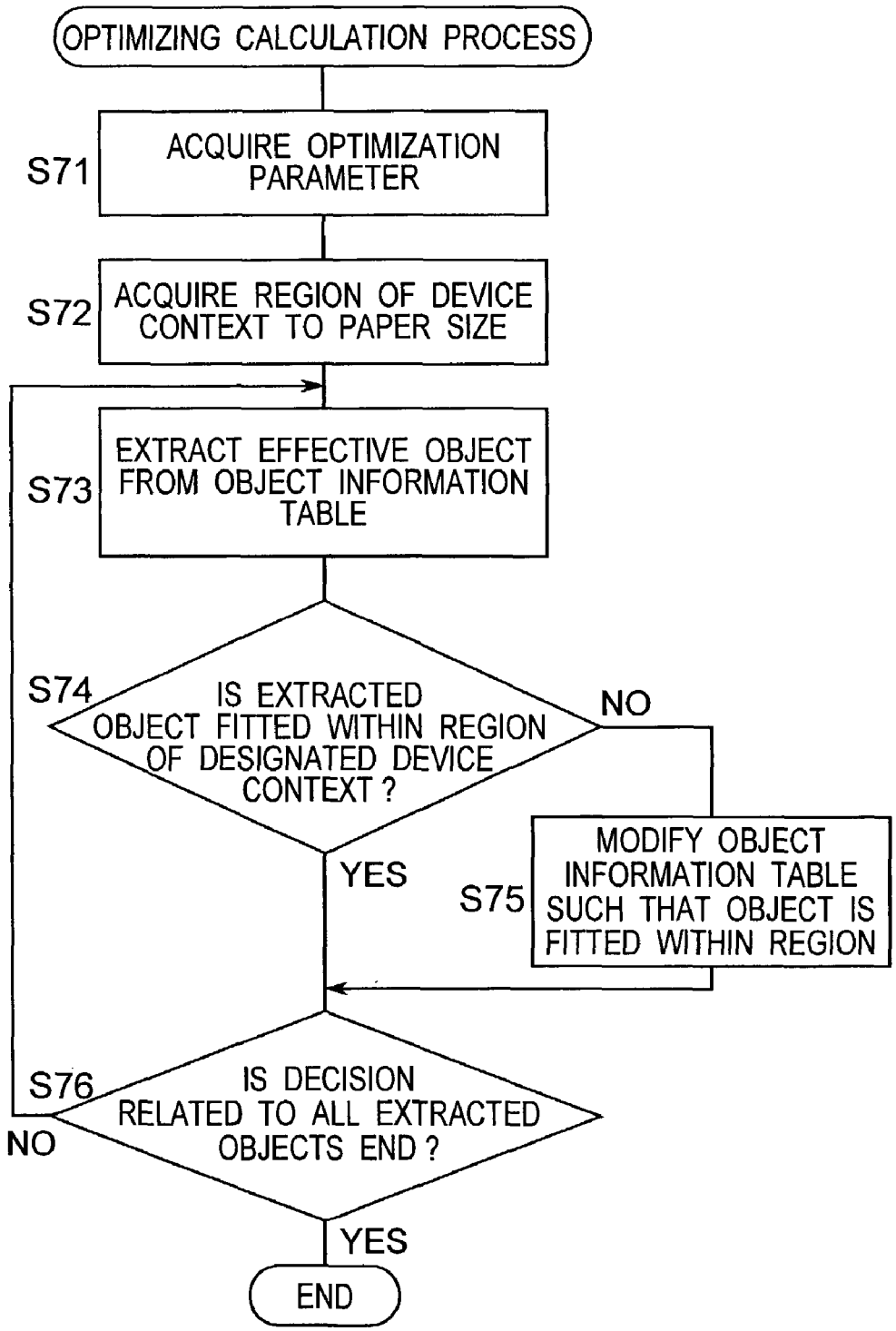
FIG. 5 is a flow chart of an optimizing calculation process executed by the printer driver according to the first embodiment of the present invention.

The device context 64 acquired by the PDL analysis unit 43a is transmitted to the optimizing calculation unit 43b and then, optimizing calculation related to the device context 64 is executed. FIG. 5 is a flow chart of an optimizing calculation process executed by the optimizing calculation unit 43b. In this optimizing calculation process, an optimization parameter information related to optimization is acquired (S71). The optimization parameter information includes pieces of information of an output paper size, the number of pages, an object ("optimization effective object" in FIG. 5) required by the optimizing process, and the like. For this reason, these pieces of information can be input by a user through a GUI screen displayed on, e.g., the monitor display of the PC 10.

The region of a device context 66 (see FIG. 6) corresponding to the output paper size is calculated (S72). The optimization effective object is extracted from the object information table 63 (S73). Thereafter, it is decided whether the object extracted in step S73 is drawn in the region of the device context 66 calculated in step S72 or not (S74). When it is decided that the object is drawn in the region of the device context 66, the control flow directly shifts to step S76. On the other hand, when it is decided that the object is drawn out of the region of the device context 66, the object information is modified such that the object is fitted in the region (S75), and the control flow shifts to step S76. Thereafter, with respect to all extracted objects, it is decided whether the decision in step S74 ends or not. In this case, when it is decided that the decision does not end, the control flow shifts to step S73 to repeat the subsequent processes. On the other hand, when it is decided that the decision ends, the processes are ended.

Figure 6:
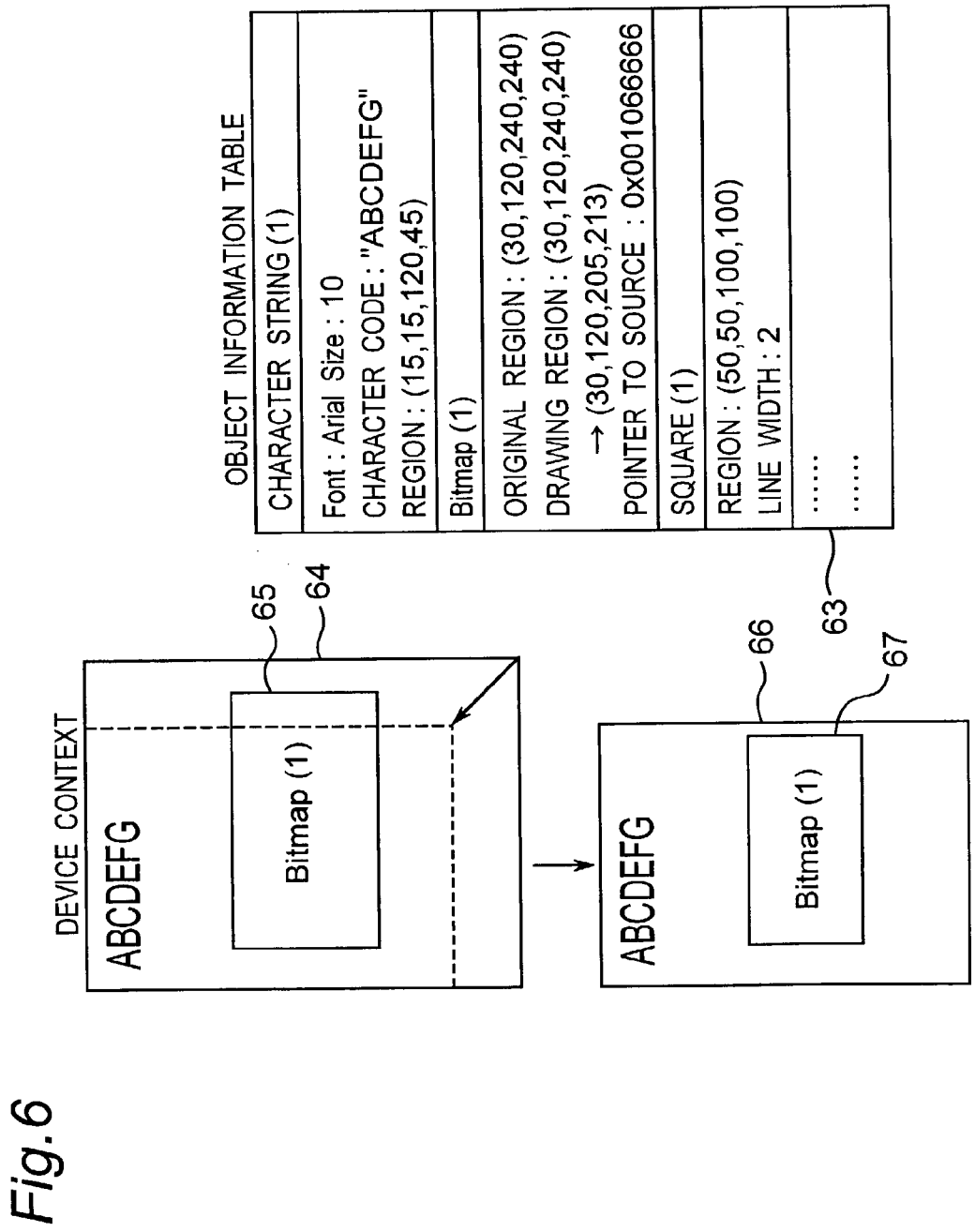
FIG. 6 is a schematic diagram explaining the optimizing calculation process.

FIG. 6 is a diagram for concretely explaining the optimizing calculation process. In this explanation, the "bitmap" included on the original device context is optimized depending on a modification into the device context corresponding to the output paper size. In the optimizing process, the region of the device context 61' is calculated in relation to the output paper size. As shown in FIG. 6, the device context 61 which early set is modified into the device context 61'. The device context 64 has a region designated by coordinates (0, 0, 270, 357) while device context 66 corresponds to A4 output paper size and has a region designated by coordinates (0, 0, 210, 297). In this case, the unit of values constituting each coordinate is "millimeter". With this modification, the bitmap 65("Bitmap (1)" in FIG. 6) having a drawing region designated by coordinates (30, 120, 240, 240), which has been fitted within the region of the original device context 64, cannot be fitted within the region of the modified device context 66.

Accordingly, the drawing region of the bitmap 65 is optimized, and thereby the bitmap 67 fitted in the region of the modified device context 65 is acquired. Thereafter, information of modification related to the drawing region of the bitmap is added to the object information table 63.

The present invention is not limited to the foregoing embodiment in which the bitmap is reduced by scaling factor equivalent for lengthwise and crosswise, and alternatively the bitmap may be reduced by scaling factor different for lengthwise and crosswise. Furthermore, for example, a drawing region designated by coordinates (100, 50, 250, 250) may be displaced without changing its size so as to take a region designated by coordinates (50, 50, 200, 250). In this case, it is premised that there is no other image data in a destination region.

The present invention is not limited to the foregoing embodiment in which the original device context 64 cannot be fitted within output paper size, that is, a region of the device context 66 acquired from calculation become smaller than a region of the original device context 64, and it is possible to modify the device context 66 to become larger than the original device context 64 depending on the output paper size.

As described above, when a function of executing an optimizing process of PDL data in accordance with the output paper size is given to the printer driver 40 (see FIG. 2), a print region designated by a user can be correctly printed within an output paper size correctly even though an application which has no means for setting and modificating the details of a layout such as arrangements of pages, characters, graphics, and the like or an application which has no function of editing the print data for the application is used.

The following is a description on other embodiments. In this case, the same reference numerals are used to designate the elements identical to those of the above first embodiment, and the details are omitted.

Second Embodiment

In the first embodiment as described above, a concrete case is explained, in which data transferred from application 30 is converted to PDL data, and thereafter an optimizing process is performed. In this optimizing process, it is possible to easily reduce and move an object such as in particular, text or table. On the contrary, in the second embodiment, a case will be explained, in which it is possible to easily reduce and move an object such as in particular, image data (bitmap data).

It is noted that components constituting a print system according to the second embodiment are identical to those shown in FIG. 1 according to the first embodiment, and the details are omitted.

Figure 7:
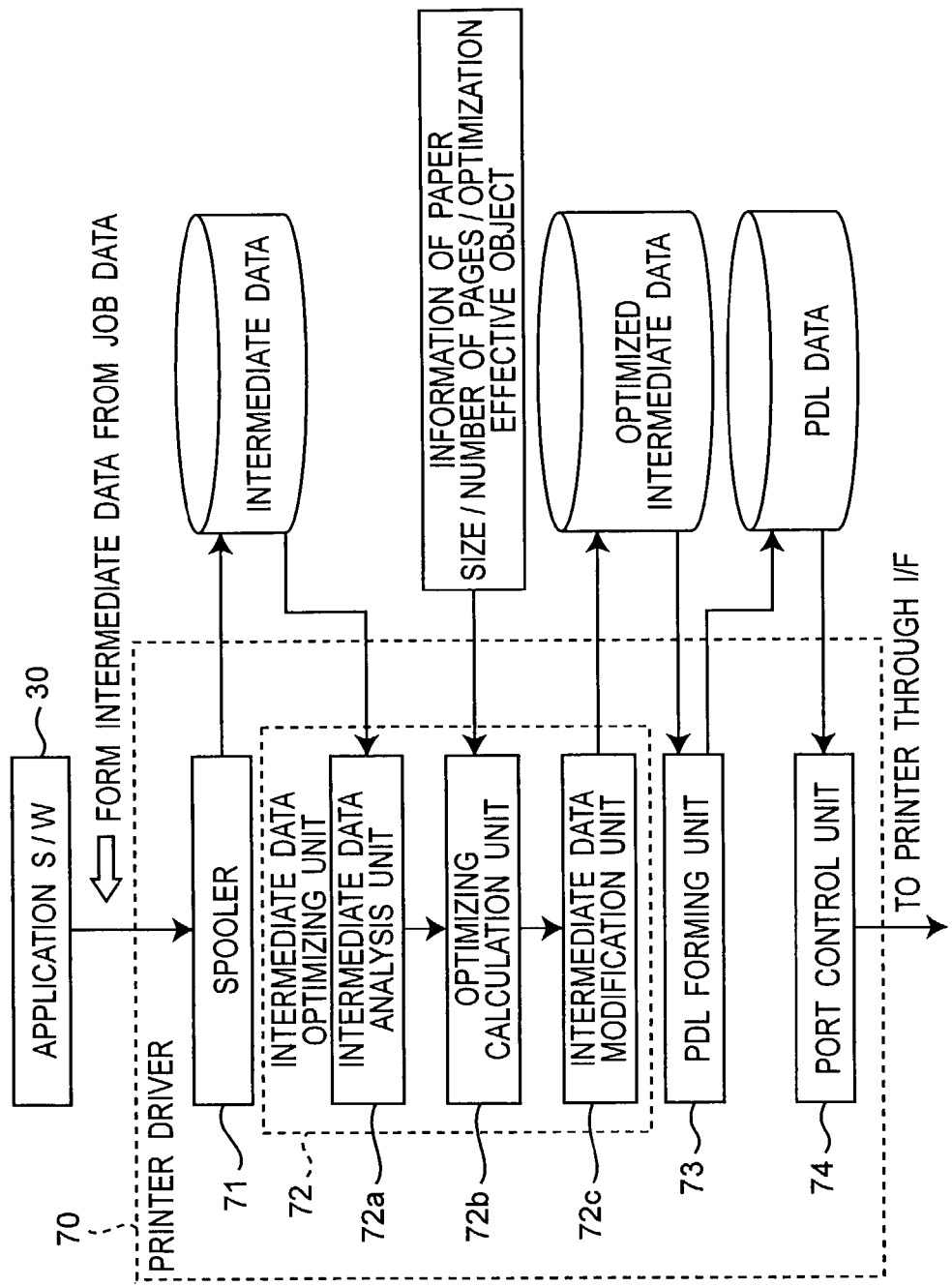
FIG. 7 is a schematic diagram showing an output process of the print job data executed on a PC by using a printer driver according to the second embodiment of the present invention.

FIG. 7 is a schematic diagram showing an output process executed by the printer driver of data (print job data) to be printed by the PC 10. When a user designates the PC 10 to print information data processed by the application 30 and displayed on the monitor display (not shown), the print job data is given to the OS first to form intermediate data based on the job data by kernel serving as the central core of the OS. The intermediate data is formed in accordance with the capability of a printer driver 70 which will be immediately used. Thereafter, the intermediate data is supplied to the printer driver 70. Although not shown especially, according to this, on the monitor display, as known in the prior art, a GUI screen obtained by the printer driver 70 is displayed. On the GUI screen, various parameters (output paper size or the like) related to print can be set by a user.

In FIG. 7, although the printer driver 70 is indicated by a plurality of hardware blocks, these blocks denote various program functions executed by the printer driver 70, respectively. In this embodiment, the printer driver 70 has, as its fundamental functions, a spooler function, a intermediate data optimizing function, a PDL data forming function, a port control function. In addition, the intermediate data optimizing function is constituted by an intermediate data analysis function, an optimizing calculation function, and the intermediate data modification function. Hardware configurations such as a spooler 71, an intermediate data optimizing unit 72, a PDL forming unit 73, a port control unit 74, an intermediate data analysis unit 72a, an optimizing calculation unit 72b, and an intermediate data modification unit 72c which execute the above functions are assumed and will be described below.

In the printer driver 70, the supplied intermediate data is temporarily stored in a storage device such as RAM 13 or hard disk 14 by the spooler 71. Next, the intermediate data stored in the storage device is optimized by the intermediate data optimizing unit 72 such that the objects is accommodated within the designated output paper size.

More particularly, the intermediate data stored in the storage device is loaded and analyzed by the intermediate data analysis unit 72a. As described below referring to FIG. 8, information of each object included in the print job data is researched and each object is identified. A position information representing a drawing region of object is acquired as the object information by calculating a position where each object is arranged on a printable area designated depending on output paper size.

Furthermore, on the basis of object information and information of objects serving as objects of the designated output paper size/the number of pages/optimization, calculation for finding how to modify (edit) a specific object is performed such that the object is fitted in the designated output paper size. On the basis of the calculation result, the intermediate data is modified by intermediate modification unit 72c. The modified intermediate data is stored in the storage device such as RAM 13 or hard disk 14.

Next, the data stored in the storage device is loaded and converted by PDL forming unit 73. The converted PDL data is temporarily stored in the storage device such as RAM 13 or hard disk 14. Thereafter, the converted PDL data stored in the storage device is transmitted to the port control unit 74 and output to the printer 20 through the I/F 15 (see FIG. 1)

Figure 8:
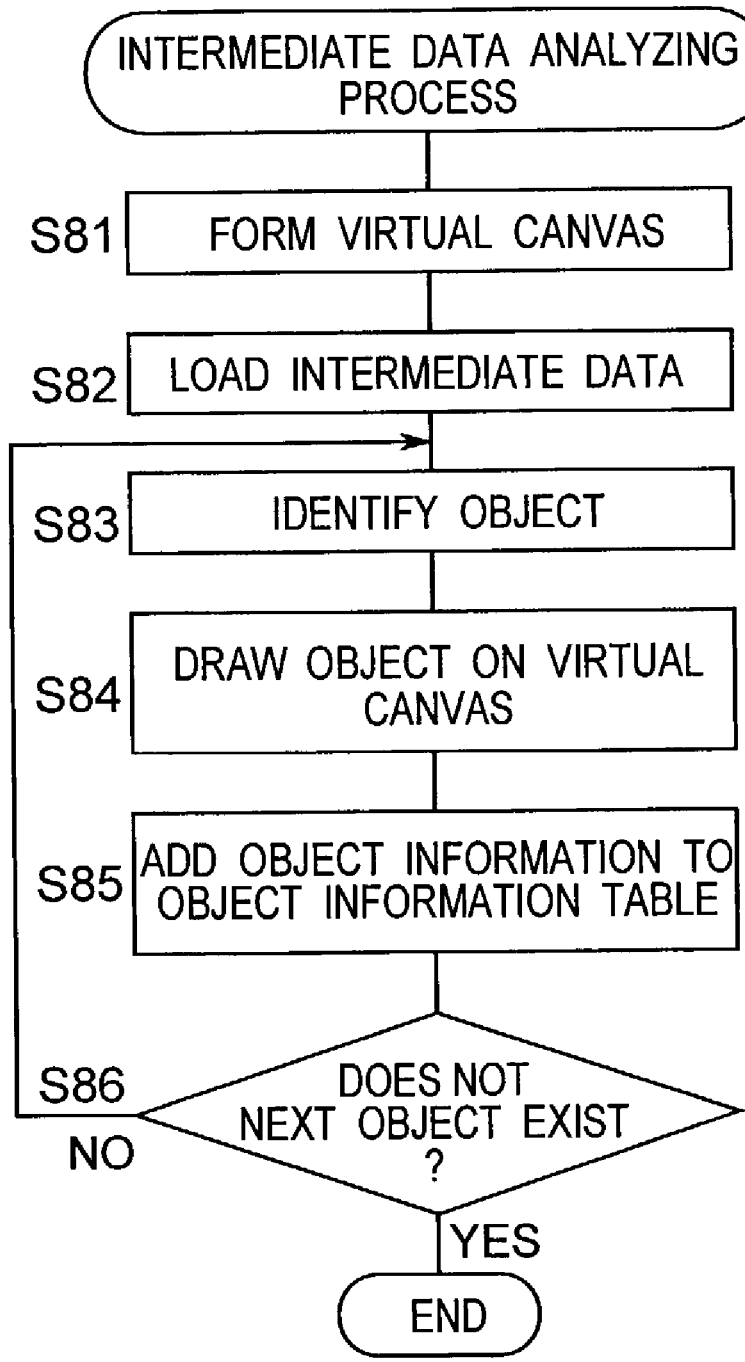
FIG. 8 is a flow chart of an intermediate data analyzing process executed by the printer driver according to the second embodiment of the present invention.

FIG. 8 is a flow chart of an intermediate data analyzing process executed by the intermediate data analysis unit 72a. In this intermediate data analyzing process, a virtual canvas is formed on the storage device such as RAM 13 or hard disk 14 of the PC 10(S81). In the virtual canvas, in relation to an object for managing the appearance of a text and a graphic on the monitor display or the printer, information is stored by a GDI. After the formation of the virtual canvas, the intermediate data stored in the storage device is loaded (S82). The intermediate data includes a parameter representing how to draw identifiers of the objects, the respective objects, and the like. As the intermediate data is loaded, the identifiers of these objects and various parameters are identified (S83).

On the basis of the identifiers of the identified objects and the various parameters, the objects are drawn on the virtual canvas (S84). Object information representing a position where an acquired object is drawn on the virtual canvas is added to an object information table (S85). Thereafter, it is decided whether the next object exists or not (S86). When the next object exists, the control flow returns to S83 to repeat the subsequent processes. On the other hand, when the next object does not exist, the processes are ended.

Figure 9:
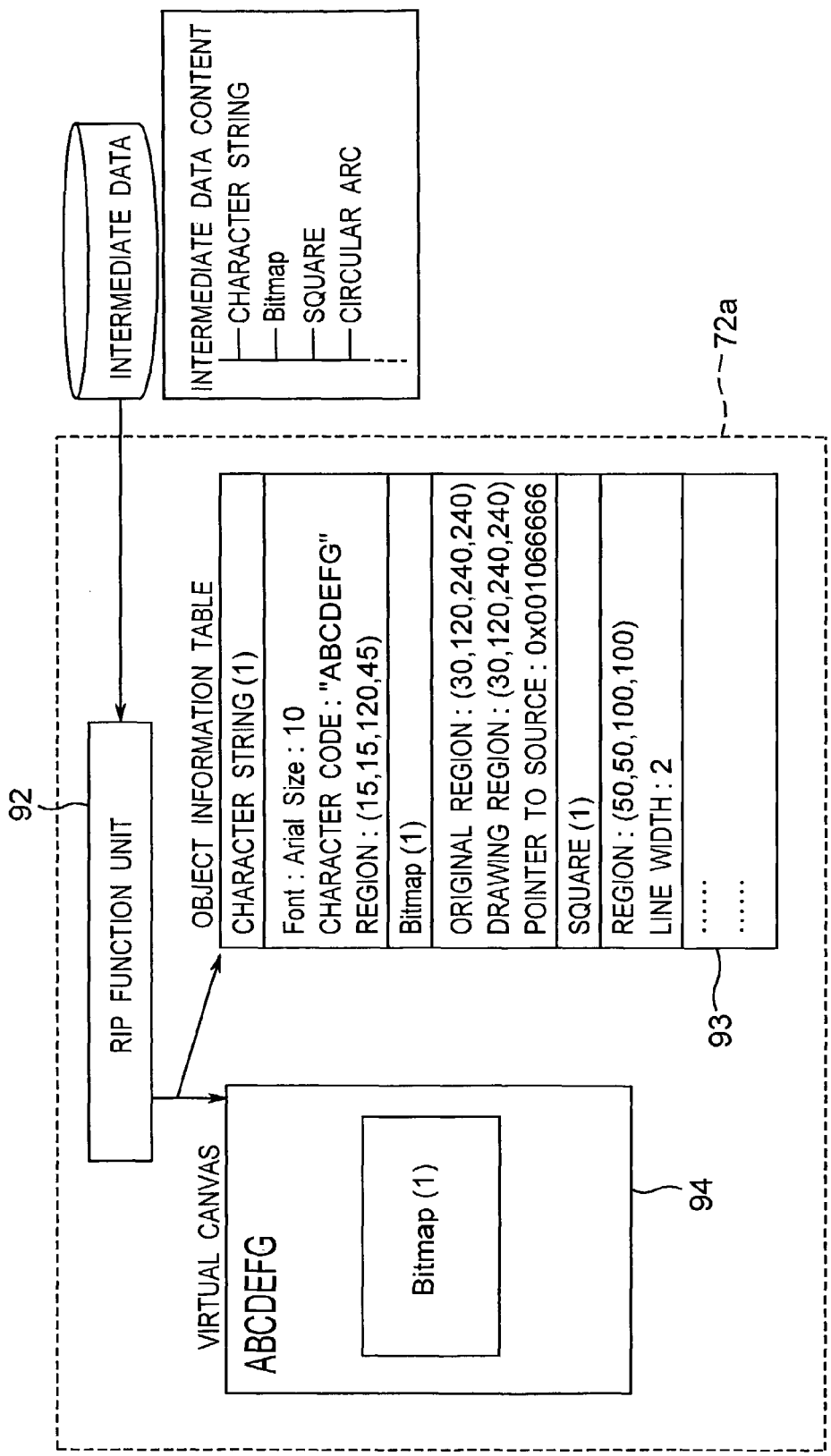
FIG. 9 is a diagram explaining the intermediate data analyzing process.

FIG. 9 is a schematic diagram explaining an intermediate data analysis process. In the intermediate data analysis process, as described above, a virtual canvas 94 on which the various objects are arranged is formed. After the virtual canvas 94 is formed, the intermediate data is loaded. The intermediate data analysis unit 72a has a RIP function which converts the intermediate data analysis described by a command into dot data. Through the RIP function unit 92, various objects are acquired from intermediate data, and sequentially arranged on the virtual canvas 94.

The intermediate data, as shown in FIG. 9, includes various objects such as a character string, a bitmap, a square, and a circular arc. The RIP function unit 92 can acquire the objects and, at the same time, can identify the identifiers of the objects and the parameters which are included in the intermediate data. The acquired various objects are drawn at a predetermined position on the virtual canvas 94 on the basis of the identifiers of the objects and the parameters.

Depending on the intermediate data analyzing process, for example, on the storage device such as RAM 13 or hard disk 14, an object information table 93 for storing information of various objects is set. With the drawing of one object, information representing a position wherein the object is drawn on the virtual canvas 94 is added to the object information table 93 and stored. Upon completion of the processes related to all the objects included in the intermediate data, the virtual canvas 94 on which the various objects are arranged is acquired.

The virtual canvas 94 acquired by the intermediate data analysis unit 72a is transmitted to the optimizing calculation unit 72b and then, optimizing calculation related to the virtual canvas 94 is executed. The optimizing calculation related to the virtual canvas 94 is performed as well as in the case of the first embodiment explained referring to FIGS. 5 and 6 and the details are omitted.

As described above, a print job data transferred from an application 30 is arranged on the virtual canvas set in the storage device after it is converted to intermediate data. If there is an object which cannot be fitted within the virtual canvas among objects constituting data, a modification such reduction or displacement to the object is performed. Then, the PDL data is generated from the intermediate data and output to printer after the intermediate data is rewritten for the modified object. In this case, an object of image data can be easily reduced and moved as well as an object such as text or table included in the intermediate data.

While the invention has been shown and described in detail, the foregoing description is in all aspects illustrative and not restrictive. It is therefore understood that numerous other modifications and variations can be devised without departing from the scope of the invention.

What is claimed is:

1. A non-transitory computer readable recording medium storing a printer driver program for controlling a print device, which is installed in a print job data processing apparatus comprising a printing system together with the printing device, the printer driver program comprising computer executable instructions of:

receiving print job data from an application program which has a print command;

analyzing the received print job data from the application program to identify objects included in the print job data, wherein the print job data includes positional information for each of the objects identifying a respective position at which each of the objects is arranged;

determining, for each of the objects, whether the respective object is fitted within a printable area corresponding to a designated output paper size based on the positional information of the respective object;

modifying the objects that are determined not to be fitted within the printable area to fit within the printable area; and performing no modification of the objects that are determined to be fitted within the printable area, wherein the modifying of the objects comprises reducing a size of a respective one of the objects to fit within the printable area, and wherein the reducing of the size of the respective one of the objects comprises utilizing two different scaling factors, one for lengthwise dimension and another for crosswise dimension of the respective one of the objects.

2. The computer readable recording medium according to claim 1, wherein the printer driver program further comprises a computer executable instruction of converting the print job data resulting from the modifying of the objects to page description language data for a drawing region for the print job data.

3. A non-transitory computer readable recording medium storing a printer driver program for controlling a printing device, which is installed in a print job data processing apparatus comprising a printing system together with the print device, the printer driver program comprising computer executable instructions of:

analyzing page description language data corresponding to print job data received from an application program to identify objects included in the page description language data, wherein the page description language data includes positional information for each of the objects identifying a respective position at which each of the objects is arranged;

determining, for each of the objects, whether the respective object is fitted within a region of a device context corresponding to a designated output paper size based on the positional information of the respective object; and modifying the objects that are determined not to be fitted within the region of the device context to fit within the region of the device context; and performing no modification of the objects that are determined to be fitted within the region of the device context, wherein the modifying of the objects comprises reducing a size of a respective one of the objects to fit within the region of the device context, and wherein the reducing of the size of the respective one of the objects comprises utilizing two different scaling factors, one for lengthwise dimension and another for crosswise dimension of the respective one of the objects.

4. A print data processing apparatus comprising a printing system together with a printing device, in which a printer driver program for controlling the printing device is installed, the apparatus comprising:

a receiver configured to receive print job data from an application program which has a print command;

an analyzer configured to analyze the received print job data from the application program to identify objects included in the print job data, wherein the print job data includes positional information for each of the objects identifying a respective position at which each of the objects is arranged;

a calculator configured to determine, for each of the objects, whether the respective object is fitted within a printable area corresponding to a designated output paper size based on the positional information of the respective object; and a modification processor configured to modify the objects that are determined not to be fitted within the printable area to fit within the printable area and perform no modification of the objects that are determined to be fitted within the printable area, wherein the modifying of the objects comprises reducing a size of a respective one of the objects to fit within the printable area, and wherein the reducing of the size of the respective one of the objects comprises utilizing two different scaling factors, one for lengthwise dimension and another for crosswise dimension of the respective one of the objects.

5. The print data processing apparatus according to claim 4, further comprising a forming unit configured to convert the print job data resulting from the modifying of the objects to page description language data for a drawing region for the print job data.

6. A print data processing apparatus comprising a printing system together with a printing device, in which a printer driver program for controlling the printing device is installed, the apparatus comprising:

an analyzer configured to analyze page description language data corresponding to print job data received from an application program to identify objects included in the page description language data, wherein the page description language data includes positional information for each of the objects identifying a respective position at which each of the objects is arranged;

a calculator configured to determine, for each of the objects, whether the respective object is fitted within a region of a device context corresponding to a designated output paper size based on the positional information of the respective object; and a modification processor configured to modify the objects that are determined not to be fitted within the region of the device context to fit within the region of the device context; and perform no modification of the objects that are determined to be fitted within the region of the device context, wherein the modifying of the objects comprises reducing a size of a respective one of the objects to fit within the region of the device context, and wherein the reducing of the size of the respective one of the objects comprises utilizing two different scaling factors, one for lengthwise dimension and another for crosswise dimension of the respective one of the objects.

7. A method of processing print job data received from an application program comprising:

receiving the print job data from the application program which has a print command;

analyzing the received print job data from the application program to identify objects included in the print job data, wherein the print job data includes positional information for each of the objects identifying a respective position at which each of the objects is arranged;

determining, for each of the objects, whether the respective object is fitted within a printable area corresponding to a designated output paper size based on the positional information of the respective object;

modifying the objects that are determined not to be fitted within the printable area to fit within the printable area; and performing no modification of the objects that are determined to be fitted within the printable area, wherein the modifying of the objects comprises reducing a size of a respective one of the objects to fit within the printable area, and wherein the reducing of the size of the respective one of the objects comprises utilizing two different scaling factors, one for lengthwise dimension and another for crosswise dimension of the respective one of the objects.

8. The method according to claim 7, further comprising converting the print job data resulting from the modifying of the objects to page description language data for a drawing region for the print job data.

9. A method of processing print job data received from an application program comprising:

analyzing page description language data corresponding to the print job data received from the application program to identify objects included in the page description language data, wherein the page description language data includes positional information for each of the objects identifying a respective position at which each of the objects is arranged;

determining, for each of the objects, whether the respective object is fitted within a region of a device context corresponding to a designated output paper size based on the positional information of the respective object; and modifying the objects that are determined not to be fitted within the region of the device context to fit within the region of the device context; and performing no modification of the objects that are determined to be fitted within the region of the device context, wherein the modifying of the objects comprises reducing a size of a respective one of the objects to fit within the region of the device context, and wherein the reducing of the size of the respective one of the objects comprises utilizing two different scaling factors, one for lengthwise dimension and another for crosswise dimension of the respective one of the objects.

* * * * *